United States Patent [19]

Evans et al.

[11] 3,764,918

[45] Oct. 9, 1973

[54] TELEMETERING REMOTE RECORDING UNIT

[75] Inventors: Ross Hugh Evans, Queens, N.Y.; Daniel Arron Seltzer, Cincinnati, Ohio; Robert Leonard Young, Florence, Ky.

[73] Assignee: Gamon-Calmet Industries, Inc., Florence, Ky.

[22] Filed: Jan. 24, 1972

[21] Appl. No.: 220,011

Related U.S. Application Data

[62] Division of Ser. No. 103,067, Dec. 31, 1970, Pat. No. 3,700,816.

[52] U.S. Cl. .......... 328/37

[51] Int. Cl. .......... C11c 19/00

[58] Field of Search .......... 328/37; 235/61, 92; 307/220, 221, 225

[56] References Cited

UNITED STATES PATENTS

| | | | |
|---|---|---|---|
| 3,624,517 | 11/1971 | Kobayashi | 328/37 |
| 3,453,551 | 7/1969 | Haberle | 328/37 |
| 3,648,180 | 3/1972 | Woodcock | 328/59 |
| 3,411,094 | 11/1968 | Martiner | 328/37 |

*Primary Examiner*—John W. Huckert
*Assistant Examiner*—R. E. Hart
*Attorney*—Lerner, David & Littenberg

[57] ABSTRACT

A system is disclosed for reading utility meters over a switched telephone network. In the system, information, including a telephone number is stored on a first punch card and reproduced by a card duplicator on a second initially blank punch card. The information representing the telephone number in addition to being reproduced on the second card, is also entered into a storage register. The number in the storage register is called up by an automatic calling unit and pulsed out onto a switched telephone network. The switched telephone network activates a meter reading circuit at an appropriate location represented by the telephone number. The meter reading circuit generates signals indicative of the meter reading and sends them back over the switched telephone network to be stored in the same storage register where the telephone number was entered. When the complete meter reading signal is in the storage register, the card duplicator is again activated to now receive information from the storage register. This information is then punched onto a still blank area on the second punch card. Details of the storage register and the circuitry at the meter are also disclosed.

9 Claims, 5 Drawing Figures

TELEMETERING REMOTE RECORDING UNIT

This is a divisional of our copending patent application, Ser. No. 103,067, filed Dec. 31, 1970, now U.S. Pat. No. 3,700,816.

FIELD OF THE INVENTION

This invention relates to remote reading of utility meters and particularly to remote reading of utility meters over a switched telephone network.

BACKGROUND OF THE INVENTION

Most buildings in the United States are provided utilities on a metered basis. In each of such buildings water, for example, is supplied by a utility company. The water passes through a water meter into each building or portion thereof so that information for billing each customer may be obtained. Presently, a meter reader periodically visits each location where a meter is located to read the meter.

Most facilities which are equipped with water meters are also equipped with telephone service. The telephones in most geographic areas are interconnected through one or more switching offices.

For at least 60 years men have thought of reading utility meters over the telephone company's wire network to eliminate the need for sending people to physically look at and read the meters. This has always been desirable because it would eliminate the need for these meter readers who not only represent a large expenditure for utility companies but also encounter difficulty occasionally in gaining access to the area where the meter is located.

The prime reason why meters are not commonly read automatically over an available telephone network is economic. In most instances, it is still less expensive to send people to read the meters than install and operate automatic meter reading equipment.

Many automatic meter reading systems presently contemplated envision the use of a high speed computer to gain access to meters. The same computer would receive and evaluate the information sent back. The philosophy behind these systems takes into account the fact that equipment located in the meter is reproduced thousands of times for each central accessing terminal so that substantially more expensive equipment can be employed at the central point.

It has been found, however, that the utility companies most likely to require automatic meter reading in the near future are the smaller ones who cannot afford the large capital outlays associated with general purpose computers or large special purpose computers.

The use of a high speed computer as the central accessing terminal presents an additional problem because information received at high speeds must be stored on tape, discs or other high speed storage devices which are serial in nature. To then process information thus received, a sorting step is normally employed searching through all the received data for various catagories or responses. For example, a search would first be initiated for busy signals, for no answers, etc. This search increases the cost of the system to the user because expensive equipment (i.e., a computer) is needed to sort such serially stored data.

Therefore, it is an object of this invention to provide a system for reading utility meters over a switched telephone network.

It is another object of this invention to provide a system for reading meters which allows sorting of received information by inexpensive equipment.

It is still another object of this invention to provide a meter reading system which not only employs inexpensive terminal equipment at each meter location but also economically calls up these locations in sequence and receives information transmitted thereby.

It is a further object of this invention to provide a shift register which enables the design of an economically feasible meter reading system.

BRIEF DESCRIPTION OF THE INVENTION

With these and other objects in view, the present invention contemplates a system in which information is retrieved selectively from a plurality of utility meters connected to numbered telephone lines. In this system a single storage register is employed for (1) presenting the telephone number of a meter to be interrogated to an automatic calling unit and (2) receiving and holding the information sent back from the interrogated meter for presentation to a card duplicator. The telephone number of the meter to be interrogated is presented to the sotrage register by the card duplicator during a card duplicating operation. The information received back and held in the storage register is presented to the card duplicator to be added to the information on the duplicated punch card at an appropriate time.

In the preferred embodiment of the invention, the storage register is constructed from latch circuits controlled by a shift register. In this way, a received multidigit data signal can be stored and shifted in synchronism without the need for a plurality of coordinated shift registers.

At each meter a novel circuit is employed which automatically inserts error checking and framing bits into the bit stream for transmission with the meter reading. At the central location the received data is monitored to prevent the presentation of erroneous data to the storage register and therefore the duplicated punch card.

Figures 1, 2:
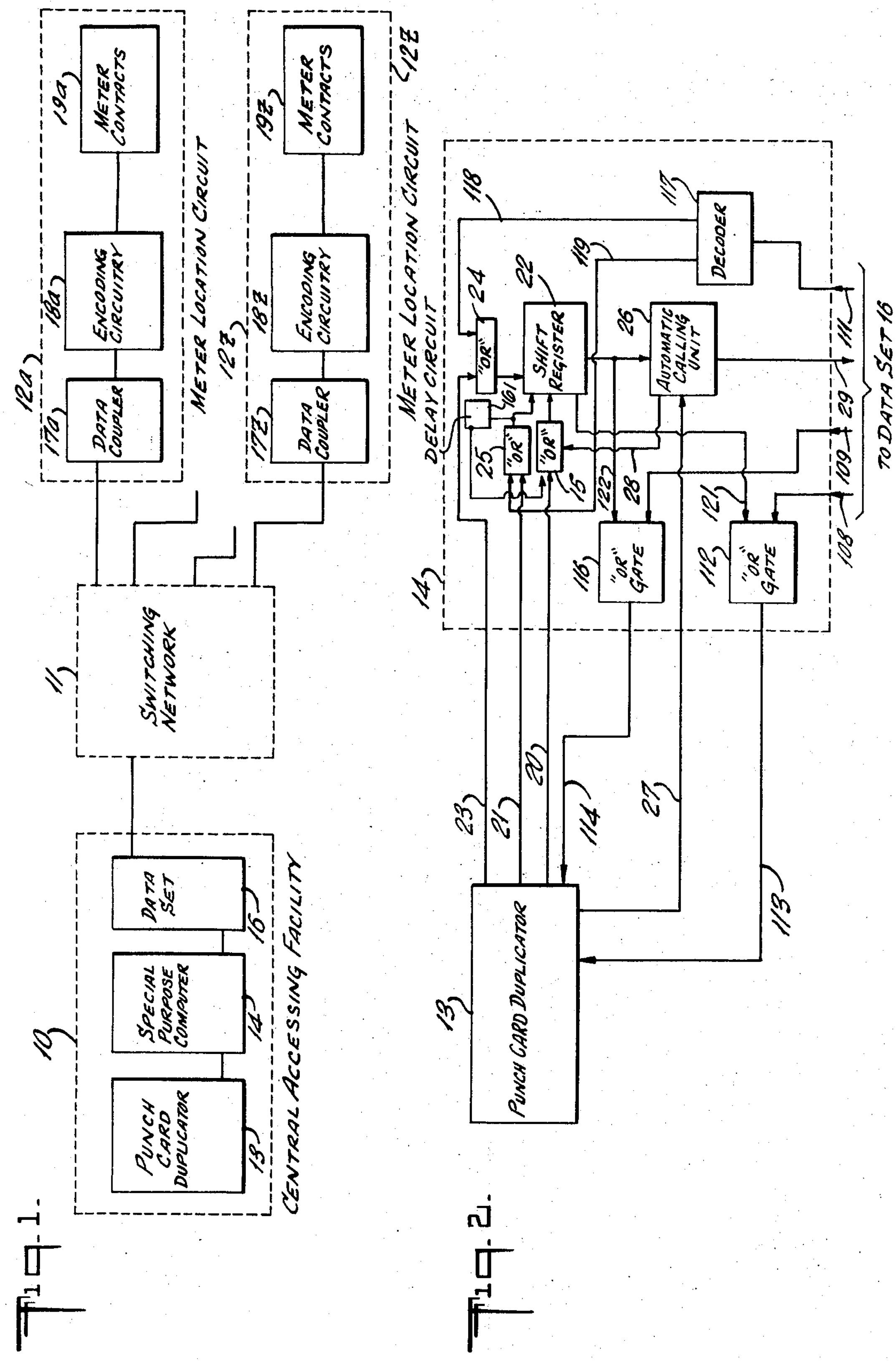
FIG. 1 is a block diagram showing the basic system contemplated by this invention.
FIG. 2 is a block diagram of a central meter accessing and information receiving system embodying the principles of this invention.

FIGS. **3*a* and 3*b* are block diagrams showing details of the system shown in FIG. 2**.

Figure 4:
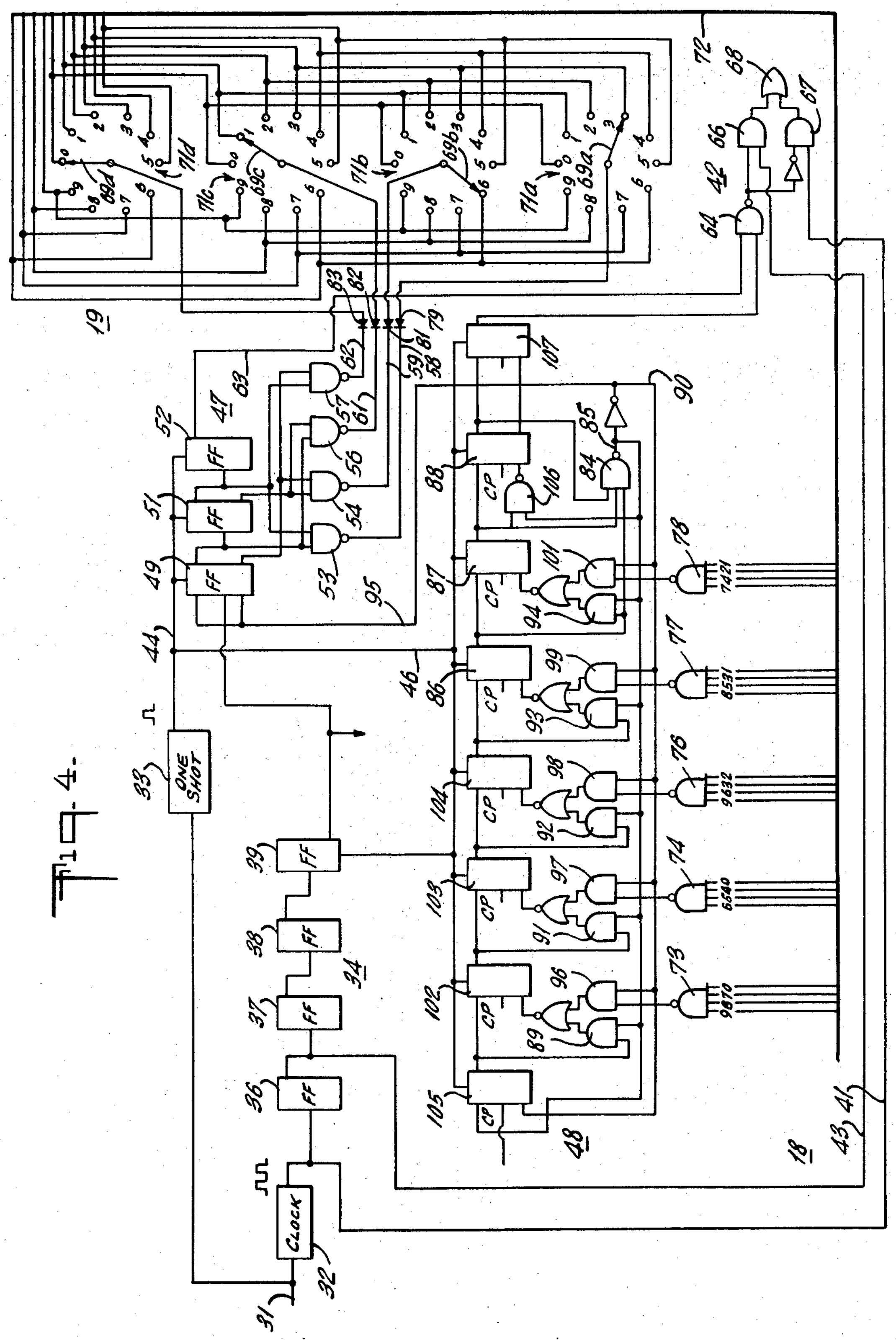

FIG. 4 is a block diagram of a meter reading circuit connected to a utility meter register which is employed in the system of this invention.

DETAILED DESCRIPTION OF THE INVENTION

Referring now to FIG. 1, we see a block diagram of a system for reading utility meters over a switched telephone network which is laid out in accordance with the teachings of this invention. The system basically is segmented into three portions, a central accessing facility 10, a switching network 11 and a plurality of meter location circuits **12*a* through 12*z***. It should be appreciated that leads interconnecting various boxes in the block diagrams may actually represent cables having a plurality of leads.

At the central accessing facility 10, a punch card duplicator 13 is connected by a special purpose computer 14 to a data set 16. The punch card duplicator 13 is a commercially available unit which individually reads a standard punched card and duplicates the card by punching the information thereon onto a blank punch card in accordance with a program normally applied to the machine in the form of a program punched card.

In accordance with this invention, portions of the information on the first punch card (i.e., a telephone number) is applied to the special purpose computer 14 which applies the telephone number through the data set 16 to the switching network 11. The switching network 11 selects the particular meter location circuit 12*a* through 12*z* represented by the applied telephone number.

The particular meter location circuit 12*a* through 12*z* selected by the switching network 11 is energized by a signal sent thereto from the switching network 11. The signal passes through a data coupler 17*a* through 17*z* to energize the associated encoding circuitry 18*a* through 18*z*.

The encoding circuitry 18*a* through 18*z* senses the condition of meter contacts 19*a* through 19*z* and transmits a code indicating of their condition back through the data coupler 17*a* through 17*z*, the switching network 11, data set 16 through the special purpose computer 14 which decodes the information and energizes the punch card duplicator 13 to record appropriate information on the duplicated punch card.

FIG. 2 shows the cooperation between the punch card duplicator 13 and the special purpose computer 14. In operation when a punched card is being duplicated by the punch card duplicator and reaches a portion thereof indicating a telephone number, the punch card duplicator under programmed control provides a signal on a lead 21 through "or" gate 25 to clock a shift register 22.

When the entire number representing the telephone number has been applied to the shift register 22 the punch card duplicator 13 applies a signal to an automatic calling unit 26 on a lead 27. The automatic calling unit 26 then applies a clock signal via lead 28 and "or" gate 15 to the shift register 22 to receive the number stored therein at a rate determined by the automatic calling unit 26. The automatic calling unit 26 pulses out the telephone number in proper format for the data set 16 to apply it to the switching network 11. It should be noted that the particular shift register 22 used is clocked through a first "or" gate 25 when it receives information and through a second "or" gate 15 when it is providing information. Other conventional shift registers can be substituted for the shift registers which are clocked at a single clocking terminal without departing from the spirit of the overall system taught by this invention. The shift register 22, however, shown in detail in FIG. 3*b* is used in the preferred embodiment of this invention because additional benefits flow from the use thereof.

The switching network 11, see FIG. 1, energizes the particular meter location circuit 12*a* through 12*z* represented by the supplied telephone number. The energization from the switching network 11 is passed through the selected data coupler 17*a* through 17*z* to actuate the encoding circuitry 18*a* through 18*z* and thereby meter contacts 19*a* through 19*z*.

FIG. 4 shows in detail the encoding circuitry 18 and the meter contacts 19. When a data coupler 17 is selected by the switching network 11, a signal is applied on a lead 31 which initiates operation of a clock 32 and a one shot 33. The signal from the clock 32 is applied to a counting chain 34 which includes four flip-flops 36 through 39. In this embodiment, the clock 32 provides a signal of 2,240 hertz. Therefore, the output from the flip-flop 36 is a signal at a 1,120 hertz. The output from the flip-flop 39 designated $C_p$ is a signal of 140 hertz. It should be clear that the number of flip-flops 36 through 39 and the frequency of the clock 32 are selected to provide signal frequencies necessary for operation of the remaining circuitry. If other frequencies were selected, one would merely change either or both the frequency of the clock 32 and the number of flip-flops in the counting chain 34.

The 2,240 hertz signal and the 1,120 signal are employed as representations of 1's and 0's in a frequency shift keying system for transmission back to the central accessing facilty 10 over the switching network 11. To this end the output from the clock 32 is applied by a lead 41 to a modulating logic circuit 42 while the output from the flip-flop 36 is applied by a lead 43 to the modulating logic circuit 42. The output from the counting chain 34 which is taken from the flip-flop 39 and designated $C_p$ is used for clocking shift registers and other counting chains in the encoding circuitry 18. It should be clear that the timing generating circuitry including clock 32 and counting chain 34 and the modulating circuitry including the modulating logic 42 could be provided by the telephone company as part of the data coupler 17 or a special data set.

The output from the one shot circuit 33 is applied by leads 44 and 46 to reset by-stable circuits included in a scanning counter 47 and a meter signal shift register 48. The shift register 48 is configured so that each stage is reset to a "1" condition rather than the normal "0" condition. The scanning counter 47 includes three flip-flops 49, 51, and 52 which act as a counting chain to count down cycles of operation of the shift register 48. The output from the flip-flops 49 and 51 are decoded by four "nand" gates 53, 54, 56 and 57 to sequentially energize leads 58, 59, 61 and 62.

The output from the third flip-flop 52 is employed to provide a gating signal to prevent transmission of information until a specified waiting interval has occurred to allow the switching network 11 to settle down. To this end the output of the flip-flop 52 is applied by a lead 63 through a "nand" gate 64, which forms a part of the modulating logic circuitry 42. During the first four counts of the scanning counter 47, an inhibit signal is applied by a lead 63 to the "nand" gate 64. The "nand" gate 64 thereby holds the "nand" gates 66 and 67 in predetermined states so that only one of the signals on the leads 41 and 43 are passed through "or" gate 68 and thereby back to the data coupler 17. It should be clear that the timing functions performed by the flip-flops 49, 51, and 52 could also be formed by shift register circuitry. If this were the case, eight shift registers and a four-input "or" gate could be employed. The first four shift register stages would be connected to the "or" gate to provide the gating signal on the lead 63. Each of the remaining shift register stages would be connected to one of the leads 58, 59, 61 or 62.

Each of the leads 58, 59, 61 or 62 are connected to the wiper arm 69*a* through 69*d* of one decimal contact transducers 71*a* through 71*d*. Each of the decimal contact transducers 71a through 71*d* has ten contact positions to which the wiper arm 69*a* through 69*d* may be connected. It should be clear that these decimal contact transducers may be constructed from coded printed circuit wheels.

The decimal contact transducers each are associated with one dial of a utility meter to be read. Corresponding contacts of each of the transducers 71*a* through 71*d* are connected in parallel. The parallel contacts are carried by the cable 72 to drive "nand" gates 73, 74, and 76 through 78 which form an encoding network to transform signals supplied by the cable 72 which are in the form of a "1 out of 10" signal into a "2 out of 5" coded signal. This transformation is well known.

The "2 out of 5" signal is arranged so that three 1's never occur in a row. In operation, each of the wiper arms 69*a* through 69*d* are energized individually by the signals on the leads 58, 59, 61 and 62 through diodes 79 and 81 through 83. When each wiper arm 69*a* through 69*d* is energized, the "nand" gates 73 through 74 and 76 through 78 provide the "2 out of 5" code to the shift register 48 which then accepts the coded information therein, adds in error checking and framing bits and shifts the signal to be applied to the "nand" gate 64 at the rate determined by the $C_p$ signal to energize the modulating logic circuit 42 for transmission of the frequency shift keyed signal back over the switching network 11 to the central accessing facility 10.

The shift register 48 is synchronized with the remaining circuitry by use of the properties of the "2 out of 5" code employed. A three input "nand" gate 84 senses the output condition of three of the shift register stages 86 through 88 in the shift register 48 to detect three consecutive 1's. The receipt by the "nand" gate 84 of these three consecutive 1's energized it to provide a transfer signal on a lead 85 and the complement thereof on a lead 90. Since the one shot 33 initially sets each stage of the shift register 48 to contain "1*'s*" a transfer signal will be initially present upon reset to load information from the first dial into the shift register 48 and advance the scanning counter 47 one count.

To this end, the complement of the transfer signal on the lead 90 is applied by a lead 95 to advance the scanning counter 47 one count upon the next occurrence of the $C_p$ signal. At the same time, the signal on the lead 85 is employed to inhibit a plurality of "and" gates 89 and 91 through 94 which in normal operation interconnect the stages in the shift register 48 for normal shift register operation. The signal on the lead 90 is at the same time employed to drive "and" gates 96 through 99 and 101 for transferring the information presented by the "nand" gates 73, 74, and 76 through 78 to five stages 102, 103, 104, 86 and 87 of the shift register 48. These five stages, therefore, now contain the "2 out of 5" coded information indicative of the reading of the particular dial being sampled by the scanning shift register 47.

The reason that the "and" gates 96 through 99 and 101 were able to transfer the meter reading information into the stage 102 through 104, 86 and 87 is that the shift register stages 105, 102 through 104 and 86 had "1's" stored therein at the time of transfer and each of the shift register stages is a JK flip-flop which will toggle when both of its inputs are high, remain the same when both inputs are low and transfer the information on its upper input to the upper output when the two inputs differ in response to a clock pulse. Since a "1" is applied to the upper input of each of the shift register stages 102 through 104 and 86 and 87 by the previous stage 105, 102 through 104 and 86 respectively, a zero applied to the lower input thereof will transfer the "1" on the J input to the output, essentially leaving the stage unchanged. Since the information from each of the gates 73, 74, 76 through 78 are passed through an "and" gate and then a "nor" gate which inverts the signal, a zero on the lower input will represent a "1" which is the signal which will be applied to the particular stage in question.

On the other hand, if a "1 " is applied to the lower input of any of the shift register gages 102 through 104 and 86 and 87, on the next $C_p$ pulse, that stage will toggle providing a zero at the output thereof. As is well understood, each of the flip-flop stages have sufficient built-in delay to continue providing the "1" to the successive stage for a sufficient period of time to enable proper information transfer.

During the transfer interval, the signal on the lead 85 is also applied as the upper input to the first stage 105 of the shift register 48 while the complement thereof on lead 87 is applied as the lower input which drives the stage 105 to have a zero at its upper output. In a like manner, a "1" is applied by the shift register stage 87 to the upper input of the shift register stage 88 while the gate 106 inverts the low now being provided by the 3-input "nand" gate 84 to apply a "1" to the higher input thereof so that the stage 88 complements in response to the next $C_p$ pulse thereby providing a "1" at the upper output thereof. The last stage of the shift register 48, 107, is made to assume the "1" stage because a "1" is present at its upper input while a zero is present at its lower input when the $C_p$ pulse arrives. Therefore, it is seen that immediately after transfer the first stage 105 of the shift register 48 contains a zero, the next five stages 102 through 104 and 86 and 87 contain the "2 out of 5" coded information, the stage 88 contains a "0" and stage 107 contains a "1".

The zero in the shift register stage 88 returns the three-input "nand" gate 84 to a high state and the signal on the lead 90 returns to a low state thus inhibiting the scanning counter 47 from advancing further and insuring that a "1" rather than a "0" is now inserted in the first stage 105 each time the $C_p$ pulse is applied thereto.

Since the "2 out of 5" code insures that no more than two "1*'s*" will occur in succession, the gate 84 will not again assume a low condition while the information contained in the stages 102 through 104 and 86 and 87 are being shifted down the shift register 48. Again since the first stage 105 was driven to the zero condition during the transfer interval, this zero will pass through to the stage 107 before the three stages 86 through 88 will have all "1*'s*" therein. At this time, transfer will again occur as above discussed. This time, however, the information transferred will be from the next dial as selected by the scanning counter 47 which has advanced one count. It should be noted that each of the stages of the shift register 47 except the last one, 107, again contain all "1*'s*." The data stored in the shift register 47 is transmitted as it is shifted into the stage 107. The stage 107 is employed to modulate the modulating logic circuitry 42 to provide either a signal of 2,240 hertz or 1,120 hertz in accordance with the information shifted thereto from preceding shift register stages. The output of the modulating logic circuit 42 is applied to the data coupler 17 and is passed through the switching network 11 back to the central receiving facility. It should be noted that since a zero was initially in the first stage 105 of the shift register 48, the information coming from the modulating logic circuit 42 will be "0," which was transferred up from the first stage 105 and is in the stage 107 upon transfer, "1" is then injected into the last stage 107 upon transfer and then "0" which is in the stage 88. These three bits serve as framing and error checking bits. The next five bits transferred are the information bits which may then be processed at the receiving location to extract meter readings therefrom. Each complete meter reading sent from a meter location 12 is a series of four 8-bit words. Each of the four 8-bit words contains information relative to the position of one dial of the meter being read. The first 3 bits of each 8-bit word are 0-1-0; the next 5 bits are the information containing bits.

The information sent back from the meter location circuit through the data coupler 17 and the switching network 11 is processed first by the data set 16 and passed onto the special purpose computer 14 (see FIG. 1). The data set 16 is equipped to recognize such responses as busy signal and no answer. Such responses are passed through the special purpose computer to be applied directly to the punch card duplicator 13.

In FIG. 2, we see that the signals from the data set 16 are applied to the special purpose computer 14 on three leads, 108, 109 and 111. When an indication, such as a busy response, is indicated by the data set 16, a signal is present on leads 108 and 109. The signal on the lead 108 is passed by an "or" gate 112 to an external punch lead 113 which enables the punch card duplicator 13 to punch information presented on a lead 114 onto the blank area of the duplicated punch card still resting in the punch card duplicator 13. The signal indicating a busy or no answer, or the like, is applied on the lead 109 and passed by "or" gate 116 to the lead 114.

If on the other hand data is being received, it is passed from the data set 16 to lead 111 which drives a decoder 117. The decoder 117 applied the decoded signal to a lead 118 which drives the "or" gate 24 to apply the signal as an input to the shift register 22. At the same time the decoder applies a clocking signal on lead 119 to the "or" gate 25 which advances the shift register 22 for accepting the information on the lead 118. When the shift register 22 is filled with a prescribed amount of information, the shift register 22 applies a signal on a lead 121 to the "or" gate 112 enabling the punch card duplicator to receive information on the lead 114. The punch card duplicator 13 applies a clocking signal on a lead 20 to the "or" gate 15 which shifts information out of the shift register 22 onto lead 122 which drives the "or" gate 116 to apply the decoded information to the lead 114. In this way, it is seen that the shift register 22 is employed to obtain information from the punch card duplicator for the pulsing out through the automatic calling unit 26 to the data set 16 and therefrom to the switch telephone network 11 and also to receive decoded information from the decoder 117 and apply it back to the punch card duplicator 13. It should be noted that when a busy signal or the like is received from the data set 16, the enabling of the lead 113 will shift the shift register 22 by means of a signal on the lead 20 but that no information will be present in the shift register 22 so that all zeros will be applied to the "or" gate 116 on the lead 122. The information coming in on the lead 109 will therefore be presented to the punch card duplicator 13.

Referring now to FIGS. *3a* and *3b*, we see, details of the decoder 117 and the shift register 22 shown in FIG. 2. The information received from the data set 16 on the lead 111 is inverted by an inverter 123 and applied by leads 124 and 126 to a flip-flop 127 and a divide by 3 circuit 128. The inverted information provided by the inverter 123 is applied to a serial to parallel converting shift register 129. The shift register 129 is advanced by a clock signal provided on a lead 131 by a clock 132. The clock 132 is energized by the flip-flop 127 when the first "1" is presented on the lead 111. As we remember, the signal transmitted from the meter location circuit began with 010 and was 8 bits long. Therefore, the first zero is not accepted by the shift register 129 but clocking begins when the first "1" is present. Therefore, there are only seven stages in the shift register 129.

When the "1" reaches the last stage of the shift register 129, the first five stages thereof contain the information sent from the meter in the "2 out of 5" code. Therefore, a signal from the last stage of the shift register 129 is applied by a lead 133 to actuate code converter 134 to read the information contained in the first five stages of the shift register 129 and provide the same information in binary coded decimal format on output leads **118*a* through 118*d***.

If information in the proper format is received on the lead 111, the remaining circuitry shown in FIG. *3a* does not come into play. However, if certain code patterns or conditions occur, the gating circuitry 141 resets the circuitry shown in FIG. *3a* and provides a signal to indicate inproperly received information.

The error checking circuitry shown in FIG. *3a* is not exhaustive but shown by merely way of example. The three errors which are checked for by the circuitry 141 are the most common ones looked for and therefore would be employed in the preferred embodiment of this invention. However, where greater assurances of proper information are required other tests could be devised to double check or check for less likely errors. Two of the circuits included in the circuitry 141 operate in response to the divide by 3 circuit 128. The "nand" gate 142 checks to insure that a "1" has not reached the last stage of the shift register 129 before three "1*'s*" have been received on the input lead 111. To this end the divide by 3 circuit 128 normally provides a "1" to one input of the "nand" gate 142 so that if a "1" appears on the second input, which is connected to the last stage of the shift register 129, an output is applied by the "nand" gate 142 to an "or" gate 143 which acts to reset the shift register 129, divide by 3 circuit 128, and the flip-flop 127 thus aborting the received cycle. This signal may also be used to drive the card duplicator 13 for indicating an abort on the punch card to be duplicated.

The second "nand" gate 144 checks to see that four "1*'s*" are not in the received signal. To this end the output from the divide by 3 circuit 128 is inverted by an inverter 146 and applied to the "nand" gate 144. The other input of the "nand" gate 144 is taken from the output of the inverter 123 so that a "1" is received on the lead 111 after the divide by 3 circuit 128 has indicated three "1*'s*" having been received, an abort signal will be provided by the "nand" gate 144 to the "or" gate 143. At this time, it should be made clear that the inverter 123 is inserted in the circuit merely to maintain logical levels.

The third "nand" gate 147 is employed to check for three "1's" in a row. To this end, 3 inputs thereof are connected to 3 consecutive stages of the shift register 129 so that if three "1's" do occur in a row the "nand" gate 147 will provide the abort signal to indicate that the received cycle should be aborted.

Figure 3A:
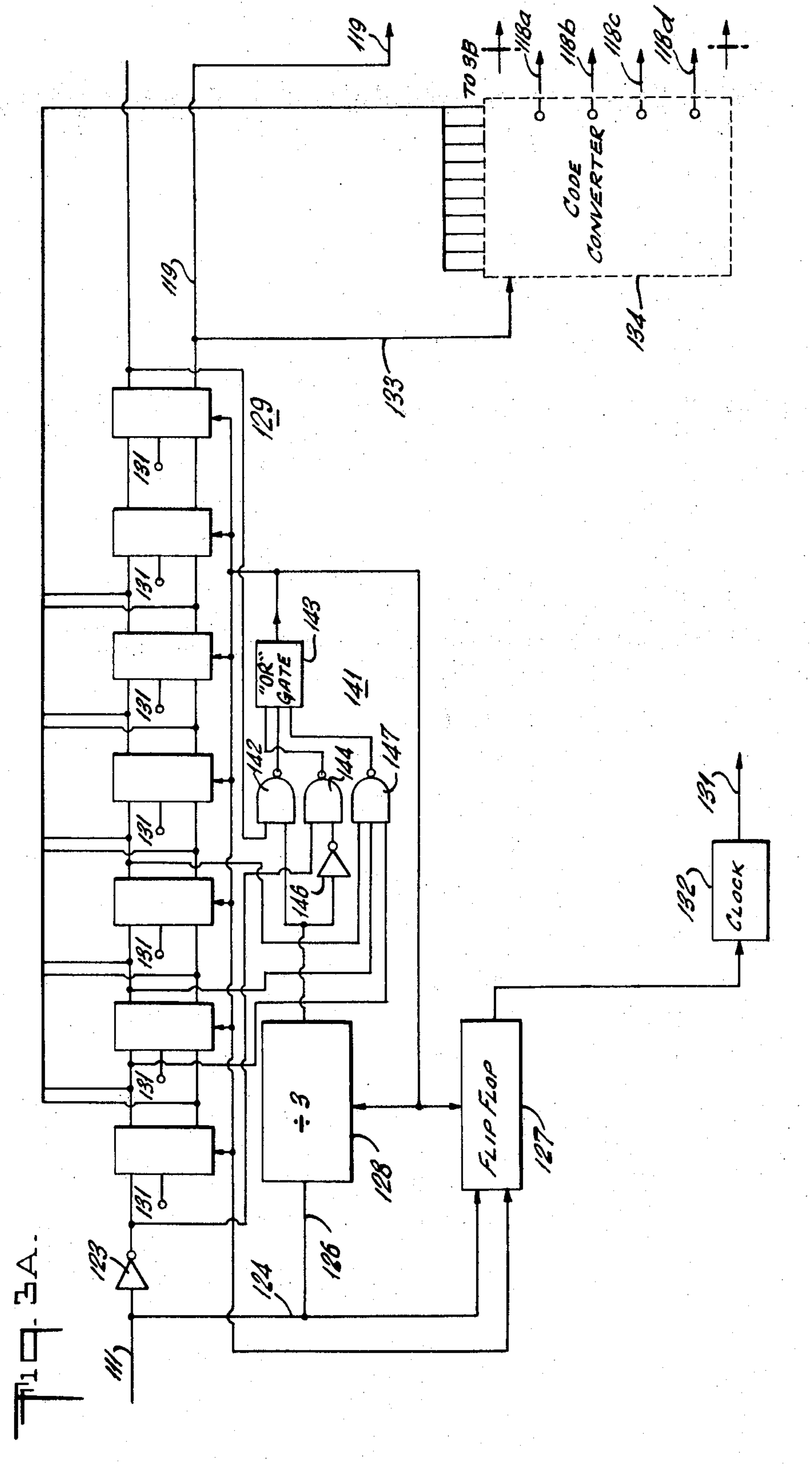
Figure 3B:
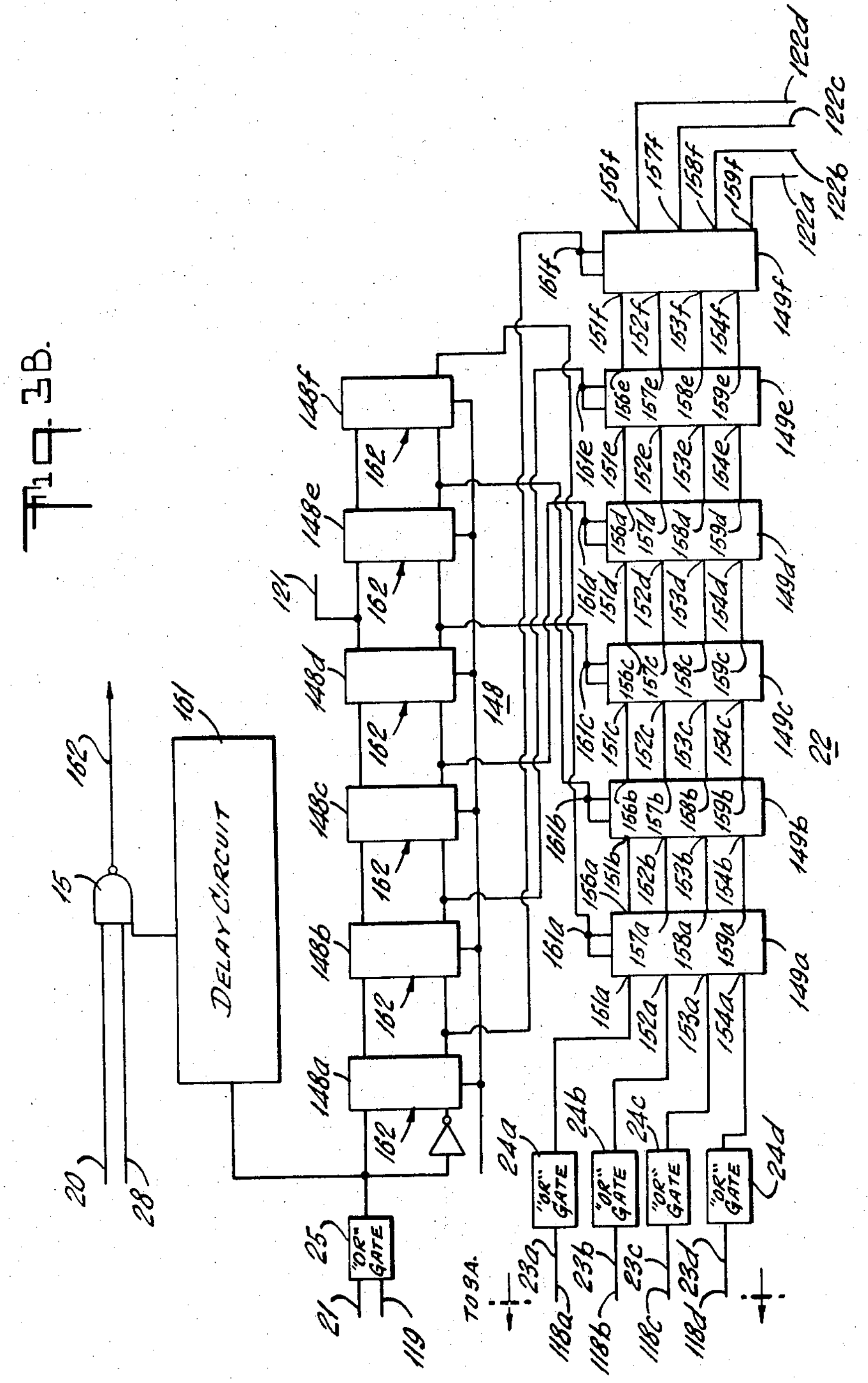

Therefore, it is seen that the circuitry shown in FIG. 3*a* merely receives the data from the data set 16, does a serial to parallel conversion and a code conversion to provide binary coded decimal information to the circuitry shown in FIG. 3*b*.

Referring now to 3*b* we see details of the shift register 22, the three "or" gates 24, 25, and 15 and the leads connecting to the shift register 22. It should be noted that the "or" gate 24 is shown as four "or" gates **24*a* through 24*d*. Since the information being transferred is in binary coded decimal which contains four bits, the "or" gate function is provided by the "or" gates. In a like manner, the lead 118 in fact carries four bits and is shown as leads 118*a* through 118*b* while the lead 23 is shown as leads 23*a* through 23*d*. The output from the shift register 22 is shown as leads 122*a* through 122*b***.

The shift register 22 is in fact a four bit parallel shift register. Normally four coordinated shift register circuits would be required but in accordance with the teachings of this invention a single shift register 148 having six stages **148*a* through 148*f* in cooperation with six four-channel latch circuits 149*a* through 149*f*** perform the function of a four-channel shift register.

A latch circuit such as the latch circuits **149*a* through 149*f* are commercially available items which each have four input terminals designated 151 through 154 and four output terminals designated 156 through 159 and a control terminal 161. When a first digital level is applied to the control terminal 161 each of the inputs 151 through 154 is conductively connected to one of the outputs 156 through 159 respectively. When a second digital level is applied to the control terminal 161, the input terminals 151 through 154 become electrically isolated from the respective output terminals 156 through 159 and the signal level which was incident upon each of the input terminals 151 through 154 is stored on the respective output terminal 156 through 159** which that input terminal has been conductively engaged with.

As seen in FIG. 3*b* the latch circuits **149*a* through 149*f* are connected in cascade with each of the output terminals 156 through 159 of the latch circuits 149*a* through 149*e* connected to one of the input terminals 151 through 154 respectively of each of the latch circuits 149*b* through 149*f*. The input terminals 151*a* through 154*d* of the latch circuit 149*a* are connected to the outputs of the "or" gates 24*a* through 24*d*. The output terminal 156*f* through 159*f* of the last latch circuit 149*f* serve as the output terminals of the four channel shift register 22 and are connected therefore to the leads 122*a* through 122*d***.

The conductive state of each of the latch circuits **149*a* through 149*f* is controlled by the single channel shift register 148 which normally contains all zeros therein so that a conductive path exists between the input terminal 151*a* through 154*a* to the output terminal 156*f* to 159*f* respectively. When data is to be entered into the shift register 22, the four bit data signal is applied, for example, on the leads 118*a* through 118*d* and a pulsed write signal is applied on the lead 119. Each time a pulse is applied to the lead 119, it is transmitted through the "or" gate 25 to insert a "1" into the shift register 148 when a shift pulse is applied to lead 162. The output of the "or" gate 25 initiates the shift pulse by driving a delay circuit 161 which in turn drives the "or" gate 15**.

When the first four bit data word is to be inserted into the shift register 22, a "1" is inserted into the stage **148*a* leaving the remaining stages 148*b* through 148*f* with zeros therein. The "1" in the stage 148*a* toggles the latch circuit 149*f* at its control terminal 161*f* rendering the four channels therein non-conductive and storing the data presented on the leads 118*a* through 118*d* at the output terminals 156*f* through 159*f* of latch circuit 149*f***. The "1'*s*" inserted into the shift register 148 are advanced therein by the clock signal provided in response to signals from the "or" gate 25 to the delay circuit 161, "or" gate 15 onto lead 162.

The next time a four bit data word is applied to the leads **118*a* through 118*d* and the pulse signal is applied to lead 119, the clock signal is again applied on the lead 162 to advance the "1" previously in the stage 148*a* to the stage 148*b* and a new "1" is inserted by the "or" gate 25 into the stage 148*a***.

Now the latch circuit **149*e* is rendered non-conductive so that the signals which were applied to leads 118*a* through 118*d* are stored at the output terminals 156*e* through 159*e* of the latch circuit 149*e*. In a like manner each time a new four bit data word is applied to the leads 118*a* through 118*d* and a pulse signal is applied to the lead 119, the next latch circuit from right to left is rendered non-conductive to store the presented four bit data word. It should be understood, of course, that the multichannel shift register 22 can also be provided with information by providing four bit data words on the leads 23*a* through 23*b* and a pulse on the lead 21**.

When the information is to be retrieved from the multichannel shift register 22, signals are merely applied on either lead 20 or 28 which is passed through the "or" gate 15 to advance the single stage shift register 148. Since no signal is provided by the "or" gate 25 a zero is now inserted into the stage **148*a*** while the "1'*s*" contained in the remaining stages are shifted one position. A zero inserted into the stage **148*a* renders the latch circuit 149*f*, again transparent so that the information in the latch circuit 149*e* is now presented at the output terminals 122*a* through 122*d*. It should be noted that previously the information contained in the latch circuit 149*f* was presented on these leads. Therefore, each time a new zero is inserted into the single channel shift register 148 a further stage is connected to the output leads 122*a* through 122*d*. Therefore, it is seen that the latch circuits 149*a* through 149*f* under the control of the single channel shift register 148** effectively serves the function of a multichannel shift register. It should be further noted that such a shift register is superior in performance to a normal multichannel shift register in that the number of stages apparently present can be changed without physically altering the circuit. Therefore, if only four four-bit data words are to be employed in the shift register which contains six stages, information can be entered in the last four stages and then read out without the need to spend the time of shifting through the extra two stages.

Therefore, since we are receiving only four four-bit data words from the meter, the fourth stage of the single stage shift register 148*e* is tapped off and connected to the lead 121 to activate the punch card reader duplicator.

It must be appreciated, of course, that when this is done as the "1's" are shifted down the single stage shift register 148 they must either be shifted out all the way to again return to the all zero condition or the single shift stage register 148 must be reset to all zeros before reloading can occur.

It should be understood that the embodiments are merely illustrative of the principles of this invention and that numerous others will become obvious to those with ordinary skills in the art in light thereof.

What is claimed is:

1. In Combination:

first and second latch circuits each having an input point, an output point, and a control point; said first and second latch circuits each being responsive to a first signal condition at said respective control points for providing a conductive path from said respective input points to said respective output points and to a second signal condition at said respective control points for providing a non-conductive condition between said respective input points and said respective output points, said first and second latch circuits being further responsive to said signal condition at said respective control points changing from said first signal condition to said second signal condition for maintaining the signal condition at said respective output points not withstanding further changes in the signal condition at said respective input points until said signal condition at said respective control points revert to said first signal condition;

means for connecting said output point of said first latch circuit to said input point of said second latch circuit; and means for successively applying (1) said first signal condition to said control points of said first and second latch circuit during a first time interval, (2) said first signal condition to said control point of said first latch circuit and said second signal condition to said control point of said second latch circuit during a second time interval and (3) said second signal condition to said control points of said first and second latch circuits during a third time interval.

2. The combination as defined in claim 1 also including:

means for applying a first information signal to said input point of said first latch circuit during said first interval and a second information signal to said input point of said first latch circuit during said second time interval.

3. The combination as defined in claim 1 in which said successive applying means applies said second signal condition to said control point of said first latch circuit and said first signal condition to said control point of said second latch circuit during a fourth time interval.

4. The combination as defined in claim 3 also including:

means for applying a first information signal to said input point of said first latch circuit during said first interval and a second information signal to said input point of said first latch circuit during said second time interval.

5. The combination as defined in claim 4 in which said successive applying means includes:

a shift register having first and second shift register stages or shifting level signals applied thereto from said first stage to said second stage;

means for connecting said first stage of said shift register to said control point of said second latch circuit; and means for connecting said second stage of said shift register to said control point of said first latch circuit.

6. The combination as defined in claim 5 also including:

means for normally applying a first level signal to said shift register, responsive to said information signal applying means for applying a second level signal to said shift register.

7. The combination as defined in claim 6 also including:

a plurality of latch circuits connected in cascade with each other and with said first and second latch circuits, each of said plurality of latch circuits having a control point; and said shift register has one stage for each latch circuit, each of said shift register stages being connected to a control point of one of said latch circuits.

8. The combination as defined in claim 6 in which said first and second latch circuits have a plurality of input points and a plurality of output points, each of said respective input points being associated with one of said respective output points, said control point controlling the electrical relationship between each pair of input points and output points in a like manner, said combination also including:

means for connecting each of said output points of said first latch circuit to one of said input points of said second latch circuit.

9. The combination as defined in claim 8 also including:

a plurality of latch circuits connected in cascade with each other and with said first and second latch circuits, each of said plurality of latch circuits having a control point; and said shift register has one stage for each latch circuit, each of said shift register stages being connected to a control point of one of said latch circuits.

* * * * *